Sept. 13, 1938.  J. H. BUCKNAM  2,129,672
BLOWPIPE
Filed March 31, 1934
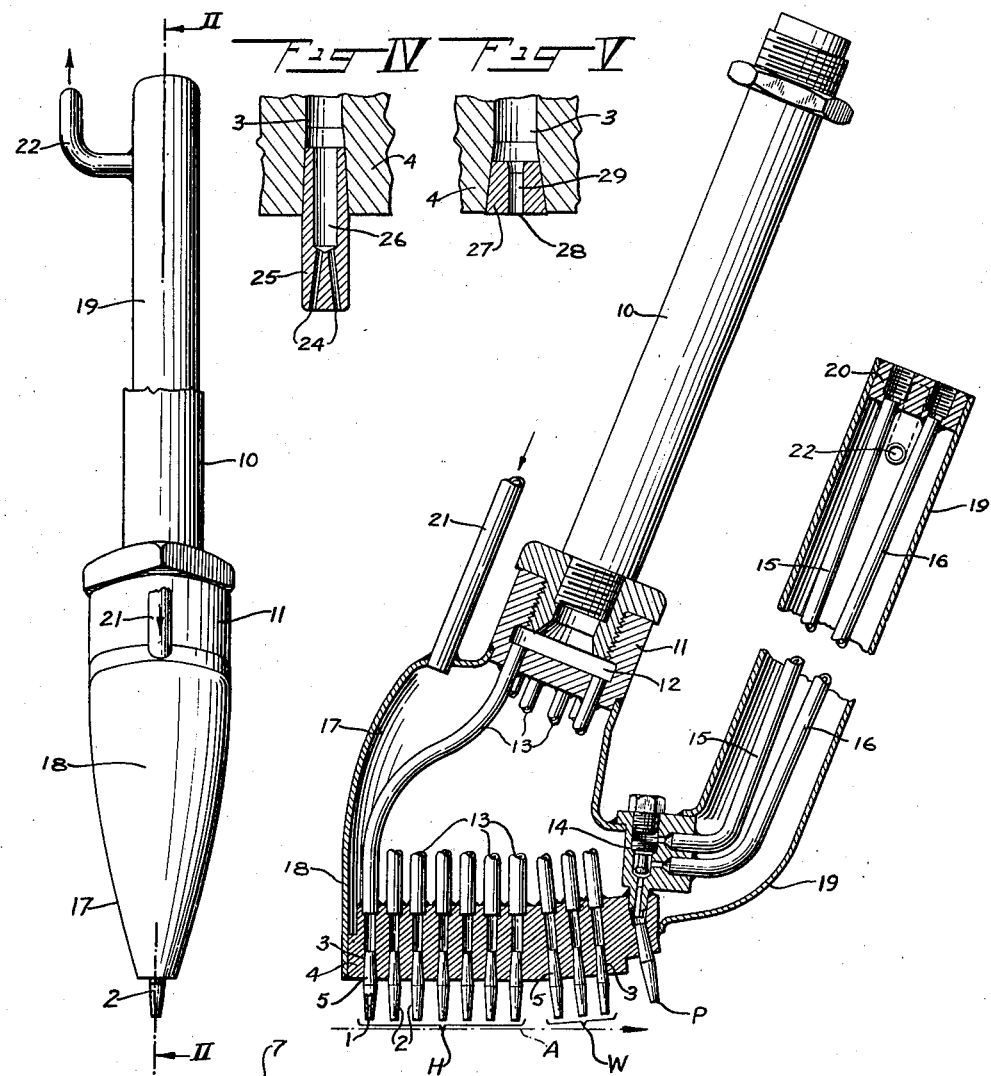
INVENTOR
J. H. BUCKNAM
BY
ATTORNEY Patented Sept. 13, 1938

2,129,672

UNITED STATES PATENT OFFICE 2,129,672

BLOWPIPE

James H. Bucknam, Cranford, N. J., assignor, by mesne assignments, to Union Carbide and Carbon Corporation, a corporation of New York Application March 31, 1934, Serial No. 718,474

7 Claims. (Cl. 158—27.4)

This invention relates to multiple flame blowpipe nozzles and has special utility in the art of machine welding or other heating processes wherein either the nozzle or the work is operated by a mechanism, but it will be understood that the principles of my invention may be utilized in other types of blowpipes.

Heretofore, the discharge orifices of the mixture gas passages in welding machine blowpipe nozzles have been formed either directly in the nozzle block or in burner tips connected by screw threads to the block. When the orifices of the passages are formed directly in the nozzle block, the passages can be closely grouped and thereby increase the intensity of the heat over the area covered by all of the nozzle flames, but it is difficult to form passages in the block having a larger inlet than discharge orifice which is desirable in such passages in order to improve the backfire resistance of the nozzle and the shape of the flames for maximum heating ability. Also, when the discharge orifices are formed in the nozzle block and the orifices are enlarged, as by burning, or cleaning the orifices, they cannot be easily repaired or renewed without changing the welding characteristics of the nozzle.

When the orifices of the passages are formed in tips which are screw threaded to the nozzle block, the tip may be replaced in the event the orifices should become damaged by burning or other incidents of use, but due to the space required for threads in the blocks and the extra thickness of tip wall for the threads on the tips, they cannot be closely grouped to produce the desired intensity of heat over the area covered by all of the nozzle flames.

Therefore, among the objects of the invention described herein is to improve the structure of multiple flame nozzles whereby the flames may be closely grouped and the flame forming passages may be quickly changed for like or unlike kinds to retain or change the welding characteristics of the nozzle without altering the nozzle block.

Other objects and novel features of this invention will be more clearly understood from the following description and accompanying drawing, in which:

Fig. I is an end view of a blowpipe nozzle and Fig. II is a sectional view on line II—II of Fig. I illustrating an embodiment of the invention; Fig. III is an enlarged lengthwise sectional view of one of the blowpipe tips shown in Figs. I and II.

Figs. IV and V are lengthwise cross-sections of modifications of different types of tips that may be employed in the nozzle block.

In accordance with this invention the gas passage discharge orifices 1 are formed in tips 2 removably secured in smooth sockets 3 in a nozzle block 4 so that the discharge orifices are arranged close to one another in rows, curved lines, or other configurations which may be suitable for welding or other heating process, such as fire finishing glass edges, where a concentration of small flames is desirable.

As shown in the drawing, the tips 2 are arranged in a single row and are made of relatively thin walled highly conductive metal, such as copper. The shank 5 of the tips 2 received by the sockets 3 in the block 4 are slightly tapered toward their upper ends. The sockets 3 in the block 4 are preferably similarly tapered and are reamed to receive the shanks 5 with a driving fit. The connection between the tip shank 5 and the socket 3 in the block 4 made in this manner is gas tight. Assuming a shank 5 having a certain wall thickness and having a gas passage 6 of a certain diameter, the driving fit connection as compared to a threaded connection between the shank 5 and the socket 3 in the block reduces the diameter of the socket measured from the root of any thread that may be used by two times the depth of the thread. Consequently, the driving fit connection permits the centers of the gas passages 6 in the tips 2 to be arranged closer together than the threaded connection by twice the depth of the threads that have been heretofore used without weakening the walls of the sockets 3 or the walls of the shanks 5 by the loss of metal beween the rims of the sockets or reduction in the wall thickness of the tip shanks 5.

Furthermore, any tip 2 may be easily removed with a pair of pliers and replaced by a new one which may be driven in with a wooden mallet or the like.

As shown in Fig. III, the inlet 7 to the gas passage 6 in the tip 2 is larger than the discharge orifice 1. The tip 2 being made separate from the block 4, the enlarged inlet 7 may be drilled from the inlet end, and the passage may be tapered toward the discharge orifice 1 which is formed at the end of a small bore 8 connected to the small end of the tapered passage 9.

The blowpipe shown in Figs. I and II is especially adapted for continuously welding straight line seams. The tips 2 are arranged in a straight line in the block and in operation are moved relatively with respect to the work along the seam. The line of the seam and the relative movement of the work, in respect to the nozzle, are indicated by the arrow A shown in Fig. II.

The preheating tips H, beginning from the end opposite to the head of the arrow A, progressively heat the edges of the seam until the edges are melted by the welding tips W nearest the head of the arrow A. The protecting tip P is rearwardly inclined in the direction of the arrow A and is adapted to produce a flame having a low heating effect and allow the molten metal to cool thereunder while it is being protected thereby from the atmosphere.

A combustible gas mixture is supplied to the preheating and welding tips H, W, through a conduit 10 connected to a block 11 having a distributing chamber 12 therein which is provided with individual tubes 13 leading therefrom to each of the tip sockets 3 in the nozzle block 4 for conducting gas to the preheating and welding tips H, W. The tubes 13 thus provide independent means connecting the inner ends of each of the gas passages or tip sockets 3 with the distributing chamber 12 which constitutes a source of gas supply.

Since a different heating characteristic is desired for the protective tip P, it is supplied with a separate combustible mixture from a separate mixer 14. The mixer 14 is supplied with a combustion-supporting gas through a pipe 15 and with a combustible gas through a pipe 16, each of the pipes being connected with the mixer and a source of gas.

The individual gas tubes 13 leading to the preheating and welding tips H, W and the tubes 15 and 16 leading to the mixer 14 are surrounded by a water jacket 17. The front portion 18 of the jacket 17 extending above the nozzle block 4 is preferably made of pressed sheet metal divided in halves along the line II—II of Fig. I, and silver soldered together around the nozzle block 4, the mixer block 14 and the gas distributor block 11. The rear portion of the jacket 17 which surrounds the tubes 15, 16 leading to the mixer 14 is an elliptical tube 19 slipped over the tubes 15, 16 and having its lower end fitted to the nozzle block 4, the other portion 18 of the jacket 17 and around the mixer block 14 and silver soldered to these parts to provide a leakproof joint. The upper end of the elliptical jacket tube 19 is silver soldered to a block 20 to which the upper ends of the mixer tubes 15, 16 are connected. A water inlet 21 is provided in the forward portion 18 of the water jacket 17 and an outlet 22 is provided in the rear elliptical tube 19. The cooling fluid circulates about the tubes 13, and over the top surface of the nozzle block 4 and around the mixer 14 as it passes upwardly through the elliptical tube 19 to the discharge outlet 22. The circulation of the cooling fluid in contact with the members through which the gas flows efficiently cools the combustible mixture for the purpose of preventing flashbacks.

A further concentration of small flames may be obtained by forming a plurality of divergent flame forming passages 24 in the same tip 25, as shown in Fig. IV. The passages 24 are connected to a larger passage 26 in the tip 25 which is supplied with a combustible mixture of gas as shown in the previous modification.

In order to protect the end of the tips and to more effectively cool the tip, a stub tip 27 having its discharge orifice 28 flush with the bottom of the nozzle block 4 may be used as shown in Fig. V. The flame forming passage or passages 29 may be formed as desired, and supplied with a combustible gas as previously described.

The blowpipe nozzle shown herein illustrates several forms of this invention, and it will be understood that changes in the details as shown may be made without departing from the scope of the invention as defined in the appended claims. Certain features disclosed but not claimed herein form the subject matter of the copending applications of F. C. Geibig, Serial No. 726,216 and J. H. Bucknam, Serial No. 728,133.

I claim:

1. A blowpipe nozzle comprising a nozzle block having a plurality of passages extending therethrough, each spaced from the other by a relatively small distance and being connected with a source of gas; and removable burner tips having shanks, said shanks being longitudinally slidably fitted in said passages, and said tips being spaced closely enough to one another to produce a substantially continuous flame.

2. A blowpipe nozzle comprising a nozzle block having inwardly tapering passages extending therethrough, the inner end of each of said passages being independently connected to a source of gas; and burner tips, each having a tapered shank separately retained in the several passages by means of a driving fit between said shank and the tapered wall of said passages, said tips being spaced closely enough to one another to produce a substantially continuous flame.

3. A blowpipe nozzle comprising a nozzle block having gas outlet means; a gas mixer block secured to said nozzle block and having gas outlet means; tubes severally supplying gas to said blocks; a cooling fluid jacket secured to said nozzle block and surrounding said mixer block and said tubes; and means for conducting cooling fluid into said jacket and discharging the cooling fluid from said jacket and circulating the cooling fluid in contact with said nozzle block and about said mixer block and said tubes.

4. A blowpipe comprising a nozzle block having a plurality of gas passages therethrough; outlet tips severally secured in the respective passages of said block solely by the frictional inter-engagement of portions of the tips with portions of said passages; and means for delivering gas from a single source of combustible gas to each of said passages individually, said tips and the corresponding passages in said blocks being substantially parallel and close enough together to produce a substantially continuous elongated heating flame.

5. A blowpipe nozzle comprising a nozzle block having a series of gas outlets; a mixer block secured to said nozzle block and having gas outlet means; gas supply tubes severally connected to said mixer block and to said nozzle block; a cooling fluid sheet metal jacket connected to said nozzle block and surrounding said mixer block and said gas supply tubes leading thereto; and means for conducting cooling fluid into said jacket and discharging cooling fluid from said jacket and circulating cooling fluid in contact with said nozzle block and about said mixer block and said tubes.

6. A multiple flame welding blowpipe comprising a nozzle block having a series of closely-adjoining substantially parallel gas passages extending therethrough and individually terminating in the top and bottom faces of said block, the bottom end of each passage terminating in an inwardly tapered socket having a smooth surface; a plurality of closely-adjoining gas supply tubes individually connected to and communicating with the top ends of said passages; and a plurality of closely-adjoining burner tips individually secured in the sockets in the bottom ends of said passages, each tip having a passage therethrough and having a smooth tapered shank conforming to the taper of the socket in which it is frictionally and removably secured, whereby each tip passage communicates through a single passage in said block with an individual gas supply tube and minimum spacing of said passages and tips may be maintained so as to produce a substantially continuous sheet of flame.

7. A multi-flame welding blowpipe comprising a nozzle block having a plurality of gas passages therethrough; individual tubes connected to the entrances of said passages and to a gas supply source, the exits of said passages being spaced closely enough to one another to produce a substantially continuous flame; and a plurality of burner tips respectively secured in the exits of said passages by a driving fit, whereby minimum spacing of said exits may be accomplished.

JAMES H. BUCKNAM.